US010889661B2

(12) United States Patent
da Silva et al.

(10) Patent No.: US 10,889,661 B2
(45) Date of Patent: Jan. 12, 2021

(54) STABLE POLYACRYLIC ACIDS, THEIR MANUFACTURE AND THEIR USE

(75) Inventors: Luiz Antonio M. da Silva, Vila Alpina (BR); Juraci Marques da Silva, Jacarei (BR); Adilson Ignacio da Silva, Vila Zelia - Lorena (BR); Antonio Severo Porto Junior, Guaratinguetá (BR)

(73) Assignee: BASF SE, Ludwigshafen (DE)

( * ) Notice: Subject to any disclaimer, the term of this patent is extended or adjusted under 35 U.S.C. 154(b) by 873 days.

(21) Appl. No.: 13/328,895

(22) Filed: Dec. 16, 2011

(65) Prior Publication Data

US 2012/0157596 A1 Jun. 21, 2012

Related U.S. Application Data

(60) Provisional application No. 61/424,440, filed on Dec. 17, 2010.

(51) Int. Cl.
| | | |
|---|---|---|
| *C08F 120/06* | (2006.01) | |
| *C08K 3/36* | (2006.01) | |
| *C08K 3/26* | (2006.01) | |
| *C08F 4/12* | (2006.01) | |
| *C08F 4/18* | (2006.01) | |
| *C08K 3/34* | (2006.01) | |
| *C08F 2/38* | (2006.01) | |
| *C08F 222/06* | (2006.01) | |

(52) U.S. Cl.
CPC ............... *C08F 4/12* (2013.01); *C08F 2/38* (2013.01); *C08F 4/18* (2013.01); *C08F 120/06* (2013.01); *C08K 3/34* (2013.01); *C08F 222/06* (2013.01)

(58) Field of Classification Search
CPC .......... C08F 120/06; C08F 20/06; C08F 2/38
See application file for complete search history.

(56) References Cited

U.S. PATENT DOCUMENTS

| | | | |
|---|---|---|---|
| 2,504,049 A | 4/1950 | Richards | |
| 2,978,501 A | 4/1961 | Adams | |
| 4,005,250 A | 1/1977 | Greiner | |
| 4,484,949 A * | 11/1984 | Potter et al. ................. | 106/798 |
| 4,509,987 A | 4/1985 | Farrar et al. | |
| 4,622,425 A | 11/1986 | Gagne | |
| 4,729,877 A | 3/1988 | Hennig et al. | |
| 4,839,417 A | 6/1989 | Suetterlin et al. | |
| 5,032,646 A | 7/1991 | Walinsky | |
| 5,055,197 A | 10/1991 | Albright et al. | |
| 5,171,725 A | 12/1992 | Wright et al. | |
| 5,268,437 A * | 12/1993 | Holy ........................ | C08F 20/04 526/227 |
| 5,275,650 A | 1/1994 | Mongoin et al. | |
| 5,294,686 A * | 3/1994 | Fiarman et al. .............. | 526/233 |
| 5,297,740 A † | 3/1994 | Landscheidt | |
| 5,317,053 A | 5/1994 | Brown et al. | |
| 5,589,522 A * | 12/1996 | Beach et al. .................. | 523/160 |
| 6,096,858 A | 8/2000 | Dobbelaar et al. | |
| 6,297,336 B1 | 10/2001 | Shioji et al. | |
| 6,335,404 B1 * | 1/2002 | Kirk ........................ | C02F 5/10 526/271 |
| 6,395,813 B1 | 5/2002 | Duccini et al. | |
| 6,403,699 B1 | 6/2002 | Röckrath et al. | |
| 6,555,629 B1 | 4/2003 | Pysall et al. | |
| 6,794,473 B2 | 9/2004 | Yamaguchi et al. | |
| 6,846,518 B2 | 1/2005 | Katoh et al. | |
| 7,115,692 B2 | 10/2006 | Mongoin et al. | |
| 7,297,205 B2 | 11/2007 | Michl et al. | |
| 7,405,264 B2 | 7/2008 | Yuasa et al. | |
| 7,462,676 B2 | 12/2008 | Suau et al. | |
| 7,851,572 B2 | 12/2010 | Suau et al. | |
| 2002/0035224 A1 | 3/2002 | Yamaguchi et al. | |
| 2003/0008995 A1 | 1/2003 | Yamaguchi et al. | |
| 2003/0149206 A1 | 8/2003 | Tomita et al. | |
| 2004/0097674 A1 * | 5/2004 | Suau et al. .................. | 526/222 |
| 2005/0020790 A1 | 1/2005 | Michl et al. | |
| 2005/0197278 A1 * | 9/2005 | Esser ....................... | C09C 1/021 510/499 |
| 2006/0111534 A1 | 5/2006 | Suau et al. | |

(Continued)

FOREIGN PATENT DOCUMENTS

| | | |
|---|---|---|
| CA | 1332856 C | 11/1994 |
| CN | 1099764 A | 3/1995 |

(Continued)

OTHER PUBLICATIONS

International Preliminary Report on Patentability dated Jun. 18, 2013, for PCT/US2011/065545, filed Dec. 16, 2013.
Nagaraj, "Minerals Recovery and Processing," Kirk-Othmer Encyclopedia of Chemical Technology, Dec. 4, 2000.
van den Haak, "Dispersants," Kirk-Othmer Encyclopedia of Chemical Technology, Apr. 18, 2003, vol. 8, No. 672-697.
Murray, "Clays," Ullmann's Encyclopedia of Industrial Chemistry, Dec. 16, 2006, vol. 9, pp. 203-235.

(Continued)

*Primary Examiner* — Karuna P Reddy

(74) *Attorney, Agent, or Firm* — Faegre Drinker Biddle & Reath LLP

(57) ABSTRACT

A polymer and methods of producing the polymer for use, for instance, in mineral processing, including kaolin and calcium carbonate beneficiation are discussed. The method of producing the polymer can include polymerizing at least one monomer in the presence of a polymerization initiator, a chain transfer agent, and a polymerization stabilizer to produce a polymer containing at least one carboxylic acid, wherein the at least one monomer includes an unsaturated carboxylic acid monomer, and wherein the polymer containing at least one carboxylic acid is stable and has a molecular weight of about 1000 g/mol to about 10,000 g/mol.

10 Claims, 8 Drawing Sheets

(56) References Cited

U.S. PATENT DOCUMENTS

| | | | |
|---|---|---|---|
| 2006/0287423 A1 | 12/2006 | Michl et al. | |
| 2008/0106968 A1 | 5/2008 | Schanz et al. | |
| 2010/0105832 A1 | 4/2010 | Csihony et al. | |
| 2010/0111809 A1 | 5/2010 | Suau et al. | |
| 2011/0028666 A1 | 2/2011 | Mattmann et al. | |
| 2011/0054071 A1 | 3/2011 | Mattmann et al. | |
| 2012/0214941 A1 | 8/2012 | Kleiner et al. | |
| 2013/0090425 A1 | 4/2013 | Wakao et al. | |

FOREIGN PATENT DOCUMENTS

| | | |
|---|---|---|
| CN | 101012293 A | 8/2007 |
| DE | 1248943 B | 8/1967 |
| DE | 3620149 A1 | 12/1987 |
| DE | 19621027 A1 | 11/1997 |
| DE | 19716373 A1 | 10/1998 |
| DE | 10311617 A1 | 9/2004 |
| DE | 102009019470 A1 | 11/2009 |
| EA | 007462 B1 | 10/2006 |
| EA | 200601948 A1 | 2/2007 |
| EP | 0 097 495 A1 | 1/1984 |
| EP | 0 313 483 A1 | 4/1989 |
| EP | 0511850 A1 | 11/1992 |
| EP | 0792890 A1 | 9/1997 |
| EP | 0 967 232 A1 | 12/1999 |
| EP | 1 024 150 A1 | 8/2000 |
| EP | 1090890 A2 | 4/2001 |
| EP | 1 500 666 A2 | 1/2005 |
| EP | 2 182 011 A1 | 5/2010 |
| EP | 2583984 A1 | 4/2013 |
| GB | 2122628 A | 1/1984 |
| JP | 06-287207 A1 † | 10/1994 |
| JP | 2000-038491 A | 2/2000 |
| JP | 2000-080396 A | 3/2000 |
| JP | 2000-328456 A | 11/2000 |
| JP | 2002-179704 A | 6/2002 |
| JP | 2003-020311 A | 1/2003 |
| JP | 2004-217899 A | 8/2004 |
| JP | 2009-242594 A | 10/2009 |
| JP | 2010-077340 A | 4/2010 |
| WO | WO-00017242 A1 | 3/2000 |
| WO | 2005/018786 A1 | 3/2005 |
| WO | WO-2007072168 A1 | 6/2007 |
| WO | WO-2009012202 A1 | 1/2009 |
| WO | 2009/133186 A1 | 11/2009 |
| WO | 2011/054789 A1 | 5/2011 |
| WO | 2011158945 A1 | 12/2011 |

OTHER PUBLICATIONS

Phipps et al., "Role of Dispersants in the Production of Fine Particle Size Calcium Carbonate and Kaolin Slurries," CIM Bulletain, 2003, vol. 96, No. 1070, pp. 55-60.
International Search Report dated Aug. 22, 2012, for PCT/US2011/065545, filed Dec. 16, 2011.
Machine translation of DE 1248943; published Aug. 31, 1967; Applicant: BASF AG.
Loiseau, J. et al., "Synthesis and Characterization of Poly(Acrylic Acid) Produced by RAFT Polymerization. Application as a Very Efficient Dispersant of CaCO3, Kaolin, and TiO2", Macromolecules, vol. 36 (2003), pp. 3066-3077.
International Search Report for PCT/EP2010/066583 dated Feb. 9, 2011.
International Preliminary Report on Patentability for PCT/EP2010/066583 dated Feb. 9, 2011 with English translation dated May 8, 2012.
Office Action dated Jun. 11, 2014 issued in U.S. Appl. No. 13/505,907, filed May 3, 2012.
Communication regarding Third Party Observations dated Apr. 10, 2014 in European Patent Application No. EPA No. 11 848 633.1.
Communication regarding Third Party Observations dated May 13, 2015 in counterpart European Patent Application No. 11 848 633.1.
Communication dated Apr. 8, 2015 in counterpart European Patent Application No. 11 848 633.1.
Chinese Office Action dated Dec. 26, 2014 for Chineses Application No. 201180065456.0 (with English translation).
Bai et al., "Synthesis of monodisperse poly(methacrylic acid) microspheres by distillation-precipitation polymerization" European Polymer Journal 43(9) pp. 3923-3932 (2007).
Russian Pat. Application No. 2013132815, Office Action dated Nov. 27, 2015 (with partial English translation/characterization).
Japanese Pat. Application No. 2013-544835, Office Action dispatched Dec. 21, 2015 (with partial English translation/characterization).
Russian Pat. Application No. 2013132815, Office Action dated Apr. 19, 2016 (with partial English translation/characterization).
Office Action dated Jan. 12, 2016 in Chinese Application No. 201180065456.0 (with partial English translation/characterization).
Supplementary European Search Report and Search Opinion dated Jul. 21, 2014 for Application No. EP11848633.1.
CN Pat. Application No. 201180065456.0, Office Action dated Jul. 30, 2015 (with English translation).
Japanese Pat. Appln. No. 2013-544835, Office Action dated Jun. 27, 2016 (with partial English translation/characterization).
Chinese Pat. Appln. No. 201180065456.0, Notice of Allowance dated Jun. 14, 2016 (with partial English translation/characterization).
European Pat. Appln. No. 11 848 633.1, Intention to Grant dated Jul. 25, 2016.
Russian Pat. Application No. 2013132815, Office Action dated Aug. 19, 2016 (with partial English translation/characterization).
Alfa Aesar, Material Safety Data Sheet, pp. 1-5, May 26, 2009, www.chemblink.com.†
Acros Organics, Material Safety Data Sheet, pp. 1-5, Apr. 1, 2008, www.chemblink.com.†
Acros Organics, Material Safety Data Sheet, pp. 1-5, Jul. 20, 2009, www.fishersci.com.†

\* cited by examiner
† cited by third party

STABLE POLYACRYLIC ACIDS, THEIR MANUFACTURE AND THEIR USE

BACKGROUND

Sodium salts of polyacrylic acids are well-known dispersants applied in mineral processing such as ceramic clays, kaolin beneficiation and calcite/marble grinding. The use of sodium polyacrylic acid (sodium polyacrylates; "NaPAA") is well described in the literature. The use of sodium polyacrylic acid (sodium polyacrylates; "NaPAA") is well described in the literature. See, for example, D. R. Nagaraj, "Minerals Recovery and Processing" 2007, Vol. 38, No. 38; D. R. Nagaraj, "Minerals Recovery and Processing" Kirk-Othmer Encyclopedia of Chemical Technology, Dec. 4, 2000; Henk J. W. van den Haak, "Dispersants," Kirk-Othmer Encyclopedia of Chemical Technology, Apr. 18 2003; and Haydn H. Murray, "Clays," Ullmann's Encyclopedia of Industrial Chemistry, Dec. 15, 2006. Slurries made of these minerals can be key materials in paper filling and coating applications and ceramic body and coating. Mineral slurries comprising sodium polyacrylates are restricted, however, in terms of the maximum level of solids that can be transported and handled, due to the influence of the sodium ions and the molecular weight architecture of the sodium polyacrylates on the slurry rheology. (Phipps P. S, Skuse D. R., "Role of dispersants in the production of fine particle size calcium carbonate and kaolin slurries," *CIM Bulletin,* 2003, Vol. 96, No. 1070, p. 55-60).

Several mineral processing references mention the production and/or use of polyacrylic acid dispersants. See, U.S. Pat. Nos. 5,294,686 and 4,005,250. Methods and/or improvements in mineral processing using polyacrylic acid dispersants are also known. See, U.S. Pat. No. 5,171,725, WO 2009/012202 A1, and WO 2007/072168 A1. The use of partially neutralized polyacrylic acids has been described for calcium carbonate grinding in U.S. Pat. No. 7,297,205.

Generally, the technology to date relates to the production and/or use of sodium polyacrylates as neutral dispersants in kaolin, and overall mineral processing and/or improvements, such as architecture molar mass or polydispersity. Since common polyacrylic acids are produced as intermediates for the sodium polyacrylates, relatively little is known about the in-plant performance of polyacrylic acids that have been properly neutralized and maintained at optimum dispersion pH. One cause is the fact that these acids are relatively unstable for long-distance transport, thus requiring the acids be neutralized at the manufacturing site of the NaPAA. Despite broad use of sodium polyacrylates in mineral processing, the possible utility of the acid forms is relatively unknown.

A need remains for stable acid forms of polyacrylates, a method of producing stable acid forms of polyacrylates, and the use of such stable acid forms of polyacrylates as auxiliaries for mineral processing.

SUMMARY

Embodiments discussed herein relate to stable acid form polyacrylate polymers, a process for preparing them, and the use of the stable acid form polyacrylate polymers as dispersants, for instance, in mineral slurries. The stable polymers of the disclosures advantageously can be neutralized in-plant or even transported and used as-is, with substantially no performance loss.

An embodiment includes a polymer containing at least one carboxylic acid, wherein the polymer containing at least one carboxylic acid is stable and can have a molecular weight of about 1000 g/mol to about 10,000 g/mol. Further, the polymer containing at least one carboxylic acid can be represented by a formula of:

Formula I:

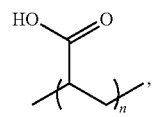

wherein "n" can be from about 13 to about 140; or

Formula II:

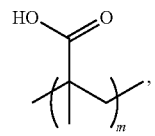

wherein "m" can be from about 13 to about 140; or
wherein the polymer containing at least one carboxylic acid can contain segments of Formula III:

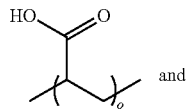

and

Formula IV:

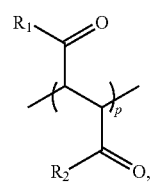

wherein "o" can be from about 8 to about 132, and "p" can be from about 1 to about 34. The ratio of segments of formula III to segments of formula IV can have a range of from 8:34 to 132:1, wherein $R_1$ and $R_2$ are each independently represent a hydroxyl group or $R_1$ and $R_2$ are bound together to form an ether linkage of an anhydride group. The polymer containing at least one carboxylic acid can be in the presence of a polymer stabilizer such as, for example, a thiazine. In an embodiment, a composition can include polymer containing at least one carboxylic acid in the presence of a polymer stabilizer, wherein the polymer stabilizer is associated in solution with the polymer.

An embodiment includes a method of producing a polymer including, polymerizing at least one monomer in the presence of a polymerization initiator, a chain transfer agent, and optionally a polymerization stabilizer to produce a polymer containing at least one carboxylic acid, wherein the at least one monomer can include an unsaturated carboxylic acid monomer and, optionally, an unsaturated monomer, wherein the polymer containing at least one carboxylic acid can be stable and has a molecular weight of about 1000 g/mol to about 10,000 g/mol. The unsaturated carboxylic acid monomer can be acrylic acid, meth acrylic acid, or combinations thereof. The unsaturated monomer can be maleic acid, fumaric acid, maleic anhydride, or combinations thereof. The method of producing a polymer can include an unsaturated carboxylic acid monomer, such as acrylic acid, wherein the polymer containing at least one carboxylic acid may have a general formula of $(C_3H_4O_2)_x$, wherein "x" can be from about 13 to about 140. The method of producing a polymer can include an unsaturated carboxylic acid monomer, such as meth acrylic acid, wherein the polymer containing at least one carboxylic acid can have a general formula of $(C_4H_6O_2)_x$, wherein "x" can be from about 13 to about 140. The method of producing a polymer can include an unsaturated carboxylic acid monomer, such as acrylic acid, wherein the polymer containing at least one carboxylic acid has a general formula of $(C_3H_4O_2)_x$:$(C_4H_4O_4)_y$, and wherein "x" can be from about 8 to about 132, and "y" can be from about 1 to about 34.

The polymerizing step can include at least one polymerization initiator, at least one chain transfer agent, and/or at least one polymerization stabilizer. Thus, the method of producing a polymer can optionally further include a polymerization initiator, wherein the polymerization initiator can be an oxidizing agent. The oxidizing agent can be selected from the group consisting of sodium persulfate, potassium persulfate, ammonium persulfate, hydrogen peroxide and combinations thereof. The at least one polymerization initiator can be added to the at least one monomer prior to or during the polymerizing step. The method of producing a polymer can optionally further include a chain transfer agent, wherein the chain transfer agent can be a phosphorous compound, an alcohol, a mercaptan, or combinations thereof. In an embodiment, the chain transfer agent comprises or consists essentially of sodium hypophosphite. The chain transfer agent can be added to the at least one monomer prior to the polymerizing step or during the polymerizing step. The method of producing a polymer can optionally further include a polymerization stabilizer in the polymerization step, wherein the polymerization stabilizer can be a thiazine compound. Exemplary thiazine compounds include phenol thiazine, diphenol thiazine, dimethyl diphenolthiazine, or combinations thereof.

Additionally, the polymerizing step can be performed in solution, and optionally, under inert atmosphere. The solution can be heated from about 85° C. to about 110° C. during the polymerizing step. After the polymerizing step, the temperature of the solution can be reduced to about 40° and at least one redox reagent can be added to the polymer containing at least one carboxylic acid, wherein the redox reagents can include sodium bisulphite. In an embodiment, the acid-containing polymer is unbranched.

The method of producing a polymer can include adding at least one redox reagent and at least one neutralization agent added to the polymer containing at least one carboxylic acid after the polymerizing step.

Further provided are compositions and methods of using the stable polyacrylic acid polymers, for instance in mineral processing. In an embodiment, a composition comprising the stable polyacrylic acid polymer and a filler is provided. Exemplary fillers include, but are not limited to, kaolin, talc, clay, white carbon, aluminum hydroxide, titanium dioxide, calcium carbonate, calcite, and mixtures thereof.

In an embodiment, a method of mineral processing can include adding a polymer containing at least one carboxylic acid to an aqueous solution containing a filler to form an aqueous slurry, wherein the polymer containing at least one carboxylic acid is stable and has a molecular weight of about 1000 g/mol to about 10,000 g/mol and wherein the polymer containing at least one carboxylic acid is represented by a formula of:

Formula I:

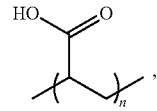

wherein "n" is from about 13 to about 140; or

Formula II:

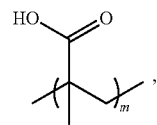

wherein "m" is from about 13 to about 140; or
wherein the polymer containing at least one carboxylic acid contains segments of Formula III:

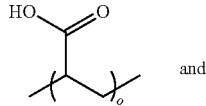 and

Formula IV:

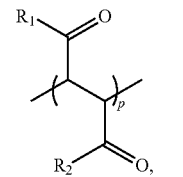

wherein "o" is from about 8 to about 132, and "p" is from about 1 to about 34, and the ratio of segments of formula III to segments of formula IV has a range of from 8:34 to 132:1, wherein $R_1$ and $R_2$ are each independently represent a hydroxyl group or $R_1$ and $R_2$ are bound together to form an ether linkage of an anhydride group. The filler can be selected from the group consisting of kaolin, talc, clay, white carbon, aluminum hydroxide, titanium dioxide, calcium carbonate, marble, calcite, and mixtures thereof.

A method of manufacturing paper can comprise: providing a composition comprising the polymer of claim 1 and a filler, wherein the filler is kaolin, calcite mineral, or marble. An embodiment, wherein a method of manufacturing ceramics can comprise: providing a composition comprising the polymer of claim 1 and a filler, wherein the filler is clay. An embodiment, wherein a method of manufacturing paints comprises: providing a composition comprising the polymer of claim 1 and a filler, wherein the filler is calcium carbonate.

It is to be understood that both the foregoing general description and the following detailed description are exemplary and explanatory and are intended to provide further explanation of the disclosed compounds, compositions, and methods.

Figure 1:
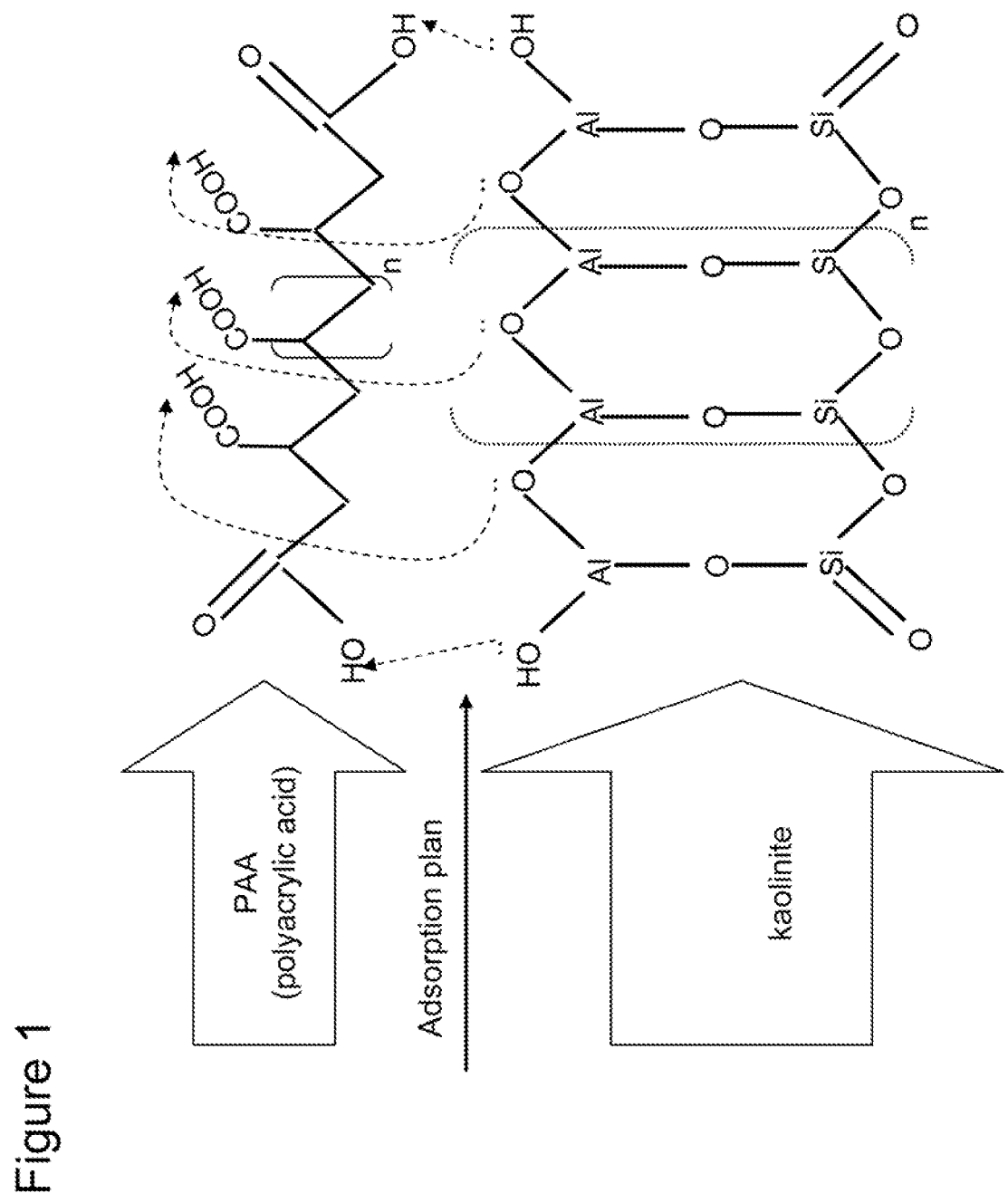
FIG. 1 is a depiction of an interaction model, which illustrates how kaolinite particles may be stabilized by the free acid groups of polyacrylic acid.

The drawings are exemplary only, and should not be construed as limiting the claims and embodiments provided herein.

DETAILED DESCRIPTION

The following definitions apply throughout the specification, unless otherwise noted.

The phrase "polymer containing at least one carboxylic acid" means a polymer having at least one carboxylic acid group attached directly to the longest chain of the polymer.

The term "stable" can mean that at least one of the molecular weight, appearance, viscosity, or color of the polymer does not substantially increase over time and, consequently, the acid form of the product maintains its performance characteristics over time. To assess whether the molecular weight of a polymer is stable, preferably the molecular weight of a polymer is measured at two points in time to determine if the molecular weight has significantly changed. A stable polymer can be a polymer with a molecular weight change of less than about 10% at the end of thirty days. In an embodiment, a stable polymer can be a polymer with a weight change of about less than 5% at the end of thirty days, or about less than 3% at the end of thirty days. Molecular weight can be determined by any technique known in the art for measuring the molecular weight of polymers, including, but not limited to, gel permeation chromotography (hereafter "GPC").

The term "unsaturated" means a molecule possessing at least one double bond or at least one triple bond.

The term "polymer stabilizer" means a compound that is capable of lowering the free energy of the polymer in solution by, for example, ionically bonding to polar groups or ionically charged groups. The term "polymerization stabilizer" means a compound that stabilizes a monomer, oligomer, and/or polymer in solution during polymerization. Further, it is understood that a compound which acts as a polymerization stabilizer during polymerization can also act as a polymer stabilizer once the polymer is formed.

The term "acid-containing polymer" means a polymer that contains at least one acid group attached to the polymer.

The term "unbranched" refers to a linear polymer that does not comprise any branches, wherein a branch is a chain of polymerized monomer that extends from the main chain. It is understood that an unbranched polymer can still have functional groups attached to the polymer, such as carboxylic acid groups, provided the functional groups do not include a polymerized monomer.

The term "in-plant" refers to a process that is performed within the confines of a chemical and/or mineral processing plant, as opposed to in the field.

The present disclosure describes a polymer containing at least one carboxylic acid that is stable and can have a molecular weight of about 1000 g/mol to about 10,000 g/mol. Molecular weight (Mw) and other molar mass parameters, including numeric molar mass (Mn) and polydispersity (Pd), can be determined by gel permeation chromatography methods known in the art. The polymer containing at least one carboxylic acid can be represented by a formula of:

Formula I:

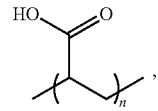

wherein "n" can be from about 13 to about 140, preferably from about 25 to about 110; or Formula II:

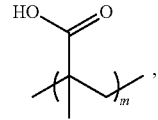

wherein "m" can be from about 13 to about 140, or from about 25 to about 110; or wherein the polymer containing at least one carboxylic acid can contain segments of Formula III:

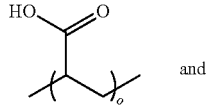

and

Formula IV:

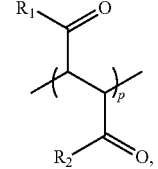

wherein "o" can be from about 8 to about 132, or from about 25 to about 110, and "p" can be from about 1 to about 34, or from about 5 to about 25. The ratio of segments of formula III to segments of formula IV can have a range of from 8:34 to 132:1, or from about 20:30 to about 100:15. $R_1$ and $R_2$ are each independently represent a hydroxyl group or $R_1$ and $R_2$ can be bound together to form an ether linkage of an anhydride group. The polymer containing at least one carboxylic acid can be in the presence of a polymer stabilizer. Exemplary polymer stabilizers include but are not limited to the class of heterocyclic compounds derivatives from thiazines, including phenolthiazine, diphenolthiazine, or dimethyl diphenolthiazine. In an embodiment, the polymer stabilizer comprises or consists essentially of phenolthiazine.

The present disclosure also describes a method of producing a polymer that includes a polymer containing at least one carboxylic acid that is stable such that the polymer can be neutralized in-plant or even transported and used as-is, with substantially no performance loss. Practicing the method of manufacture described herein, the polymers can be homopolymers and copolymers that can be produced to a final polymer solids level of 48-60%. "Final polymer solids level" as used herein refers to the amount by weight of polymer, relative to the amount by weight, of the polymer and water, in the reactor at the end of polymerization.

An embodiment includes a method of producing a polymer, wherein at least one monomer is polymerized in the presence of a polymerization initiator, a chain transfer agent, and a polymerization stabilizer to produce a polymer containing at least one carboxylic acid, wherein the at least one monomer can include an unsaturated carboxylic acid monomer and, optionally, an unsaturated monomer, wherein the polymer containing at least one carboxylic acid is stable and can have a molecular weight of about 1000 g/mol to about 10,000 g/mol. The unsaturated carboxylic acid monomer can include acrylic acid, meth acrylic acid, or combinations thereof. The unsaturated monomer can include maleic acid, fumaric acid, maleic anhydride, or combinations thereof.

Without wishing to be bound by theory, a utility of the at least one monomer, including the unsaturated carboxylic acid monomer in a homopolymer and the unsaturated dicarboxylic acid monomer in a copolymer, may be to provide a polymer scaffold that is functionalized with highly polar groups, such as carboxylic acid groups. Due to the size of the acid-containing polymer produced, the disclosed methods and the presence of highly polar groups, the resultant acid containing polymer can act as a dispersant in polar solvents, including aqueous solutions, by providing particles with stabilizing steric and electrostatic interactions that prevent or limit aggregation of particles in solution. Thus, the monomer units are not particularly limited as long as they are capable of being polymerized and at least one of the monomer includes at least one polar group.

Examples of a monomer having at least one polar group may include: acrylic acid, meth acrylic acid, dimers and trimers of acrylic acid or meth acrylic acid, crotonic acid, vinyl acetic acid, maleic acid, maleic anhydride, fumaric acid, glutaric acid, itaconic acid, citraconic acid and mesaconic acid, phthalic anhydride and phthalic acid and acrylamido-2-methylpropanesulfonic acid (AMPS).

The method of producing a polymer can include an unsaturated carboxylic acid monomer, such as acrylic acid, wherein the polymer containing at least one carboxylic acid can have a general formula of $(C_3H_4O_2)_x$, wherein "x" can be from about 13 to about 140, preferably 25 to 110. The method of producing a polymer can include an unsaturated carboxylic acid monomer, such as meth acrylic acid, wherein the polymer containing at least one carboxylic acid can have a general formula of $(C_4H_6O_2)_x$, wherein "x" can be from about 13 to about 140, preferably 25 to 110. The method of producing a polymer can include an unsaturated carboxylic acid monomer, such as acrylic acid, where in the polymer containing at least one carboxylic acid can have a general formula of $(C_3H_4O_2)_x:(C_4H_4O_4)_y$, and wherein "x" can be from about 8 to about 132, preferably 25 to 110, and "y" can be from about 1 to about 34, preferably 5 to 25.

The method of producing a polymer can include a polymerization initiator, wherein initiators can be oxidizing agents, including but not limited to sodium persulfate, potassium persulfate, ammonium persulfate, hydrogen peroxide, and combinations thereof, in an embodiment, the polymerization initiator comprises or consists essentially of a persulfate based initiator, A utility of a polymerization initiator is to facilitate the polymerization of the at least one monomer. Therefore, the choice of polymerization initiator is not particularly limited, so long as the polymerization initiator starts a polymerization reaction.

Radical initiators include: inorganic peroxides like alkaline and ammonium salts of peroxo sulphate, such as sodium persulfate, potassium persulfate, ammonium persulfate, and sodium hydroxymethanesulfinate hydrate. Radical initiators can also include water soluble azo compounds, such as, 2,2'-azobis (2-methylpropionamidine) dihydrochloride and 2,2'-azobis[N-(2-carboxyethyl)-2-methylpropionamidine] hydrate.

The method of producing a polymer can include a chain transfer agent, wherein suitable chain transfer agents include the class of phosphorous based salts and mercaptans. In an embodiment, the chain transfer agent comprises or consists essentially of sodium hypophosphite. A utility of a chain transfer agent includes the transfer of a propagating radical from one polymer chain to start the polymerization of another polymer chain, such that the molecular weight of the resulting polymer can be controlled, in part, by the amount of chain transfer agent added. That is, as the amount of chain transfer agent increases, the average molecular weight of the polymer produced will decrease.

Chain transfer agents include water soluble compounds, including mercapto alcohols, such as mercaptoethanol; and thioacids, such as thioglycolic acid. A chain transfer agent can also include a redox system such as the use of mercaptoethanol, alkyl mercaptans, and the like to control molecular weight in conjunction with a reducing agent like sodium sulphite or sodium bisulphite.

The method of producing a polymer can include a polymerization stabilizer, wherein suitable polymerization stabilizers can include, but are not limited to, the class of heterocyclic compounds derivatives from thiazines, including phenolthiazine, diphenolthiazine, dimethyl diphenolthiazine. Polymerization stabilizers may also include a phenylenediamine compound, such as N,N'-bis(alkyl)-p-phenylenediamines, or even N,N'-dinitroso phenylenediamine derivatives. In an embodiment, the polymerization stabilizer comprises or consists essentially of phenolthiazine and its derivatives. The "presence" of a stabilizer or the "association" of a stabilizer with a polymer in solution can be detected by the high performance liquid chromatography (HPLC) methods.

A neutralization step can be performed by adding a neutralization agent, which can include sodium hydroxide, potassium hydroxide, sodium carbonate, potassium carbonate or any other alkali salt or/and hydroxide. A utility of a neutralizing agent can include, reducing the of a solution, so it is understood that any basic compound can serve as a neutralizing agent.

In an embodiment, the method of producing a polymer containing at least one carboxylic acid can include polymerizing at least one monomer in the presence of at least one radical initiator, at least one chain transfer agent and at least one polymerization stabilizers in a solution. The solution polymerizing step is not limited with respect to temperature, solvent, concentration, or atmospheric conditions. The temperature range can be from about 85° C. to about 110° C. during the polymerization step, because a utility for this range of temperature can include the thermal activation of a polymerization irritator. The solvent can include any solvent or mixture of solvents capable of dissolving the monomer chosen. In an embodiment, the solvent is water. The atmosphere is not limited. In an embodiment, the atmosphere can be an inert atmosphere, including nitrogen or argon. A utility of an inert atmosphere can include preventing side reactions of the polymerization step with reactive molecules in the atmosphere, such as molecular oxygen.

Advantageously, the polymer containing at least one carboxylic acid described herein is stable. The stable polymer has better stability in terms of molecular weight retention and no statistically significant increase of the molecular weight over time, relative to prior art NaPAAs. Stability may be assessed by molecular weight determination from time to time, using direct measuring methods such as GPC. Stability can also be indirectly measured based on performance measurements in terms of the amount of polyacrylic acid, in its sodium salt form, required to disperse a certain amount of standard kaolin (measured in kg/ton). As a result of the stability of the polymer, the polymer does not require neutralization at the site of its manufacture or prior to transport. That is, the stable acid form polyacrylate polymers described herein can be transported as-is, without neutralization, enabling optimization of transport costs. Moreover, the stable acid form polyacrylate polymers contribute to superior rheological performance of mineral slurries comprising the acid form polyacrylate polymers.

It is believed that a stable polymer containing at least one carboxylic acid works as an effective dispersant after appropriate "in-plant neutralization," because it is possible to optimize the pH of a solution containing the stabilized polymer to obtain a dispersion with the lowest possible viscosity. As such, the optimized pH may be a single pH point or a pH range that provides the slurry with the lowest viscosity. Without wishing to be bound by theory, it is believed that the mechanism for the stable polymer acting as a dispersant may be based on electrosteric stabilization whereby the negatively charged polymer chains surround a filler, such one or more mineral particles, to stabilize the filler, thus avoiding coagulation and flocculation of the filler. Referring to FIG. 1, which depicts a non-limiting model, the lower viscosity and better rheology of the slurry may be due to the use of polyacrylic acids and proper pH adjustment. The use of polyacrylic acids and proper pH adjustment allows for the hydroxyl groups and oxygen atoms of the alumina layer to be stabilized by hydrogen bonding to the non-dissociated carboxyl groups (COOH$^-$) of the polyacrylic acids. The use of polyacrylic acids provide an absence of sodium and aluminum ions in the aqueous media, which provides less structure and, consequently, less viscosity. The use of stable polyacrylic acids and its in-plant neutralization allows for a dispersion with little or no excess of sodium in the slurry through proper reduction of pH from an alkaline range (>7.0 pH) to neutral or almost neutral range (6.0<optimum pH<7.0). Thus, it is possible to optimize the pH process with no addition of inorganic salts like aluminum sulphate so that these conditions allow for low viscosity slurries to be obtained. Further, it is possible to produce mineral slurries with higher solids content. For example, slurries may be prepared with solid contents of from 65% to 67%, 70%, or even higher, depending the kaolin type and its respective morphology. In GCC (calcite or marble grinding) processes, the use of such polyacrylic acids allows for proper pH adjustment and, consequently, optimization of the grinding process. The optimization of the grinding process can yield better low shear rheology in the slurry, so that the viscosity of the end slurry after one, two, twenty four, or even forty eight hours remains in a reasonable range for being handled and pumped.

Accordingly, in an embodiment, a method of using the polymer containing at least one carboxylic acid as a dispersant for mineral processing is provided. For example, a method of mineral processing can include adding a polymer containing at least one carboxylic acid to an aqueous solution containing a filler to form an aqueous slurry, wherein the polymer containing at least one carboxylic acid can be stable and can have a molecular weight of about 1000 g/mol to about 10,000 g/mol and wherein the polymer containing at least one carboxylic acid can be represented by a formula of:

Formula I:

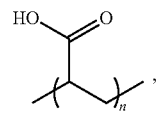

wherein "n" can be from about 13 to about 140, preferably 25 to 110; or

Formula II:

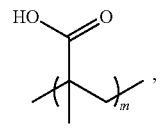

wherein "m" can be from about 13 to about 140, preferably 25 to 110; or wherein the polymer containing at least one carboxylic acid can contain segments of Formula III:

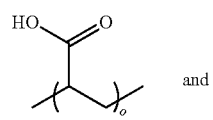

and

Formula IV:

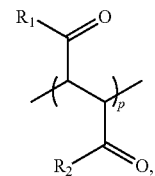

wherein "o" can be from about 8 to about 132, preferably 25 to 110, and "p" can be from about 1 to about 34, preferably 5 to 25. The ratio of segments of formula III to segments of formula IV can have a range of from 8:34 to 132:1, wherein $R_1$ and $R_2$ can each independently represent a hydroxyl group or $R_1$ and $R_2$ can be bound together to form an ether linkage of an anhydride group.

As used herein, "mineral processing" encompasses processing of mineral and processing of non-mineral fillers. Accordingly, exemplary fillers in the method of mineral processing include kaolin, talc, clay, white carbon, aluminum hydroxide (e.g., gibbsite), titanium dioxide, calcite, marble, calcium carbonate, and combinations thereof. Calcium carbonate ($CaCO_3$) has a number of polymorphs, including calcite and aragonite. Calcite (also called calcite mineral) is the most stable polymorph of calcium carbonate. Marble is a metamorphic rock composed of recrystallized carbonate minerals, most commonly calcite or dolomite. White carbon refers to a white silica powder made from silicon tetrachloride that is used, for instance, as a replacement for the filler carbon black.

The typical processing steps for kaolin and other clay type minerals can include: 1) a primary dispersion through blungers, where the "ROM" (run of mine) mineral can be dispersed and the sand separated, 2) a second dispersion where the beneficiated filters clay cakes may be re-dispersed to produce slurries, and 3) evaporation of the re-dispersed slurries in order to concentrate the slurry to produce slurry grades or further drying in towers to produce spray drying grades. In all of these processes, there can be dispersion involved and requirements to control the low shear rheology. Therefore, the viscosity can be kept as low as possible to optimize solids content and save energy in various operations, such as sand separation, filtration, pumping, heating, spray drying, storage, transport, and even during further use. For calcium carbonate, the process can be the wet grinding step, wherein the use of such polyacrylic acid can allow for easy flow of the slurry through grinders, which can result in energy savings, because the grinding steps can allow for lower viscosity for the end slurries and also, better rheology.

The method of mineral processing can include a neutralizing step, wherein a neutralizing agent is added to the slurry for a proper pH process adjustment. The addition of neutralizing agent allows the pH of the resulting slurry to be lowered or increased to an optimized pH, which allows for a slurry having improved viscosity to be formed. In an embodiment, the pH of the slurry may be adjusted with sodium hydroxide, potassium hydroxide, sodium carbonate, potassium carbonate, sodium bicarbonate or any other alkali salt or/and hydroxide. In an embodiment, the pH of the slurry may be lowered/adjusted with such polyacrylic acids, which can make for a better alternative: one that does not affect the rheology as do common salts, like aluminum sulphate.

As demonstrated herein, the polymer containing at least one carboxylic acid possesses storage stability. In addition, the polymer containing at least one carboxylic acid demonstrates improved viscosity reduction in mineral slurries, such as kaolin slurries, as well as a lower tendency for viscosity increase during slurry storage, compared to current commercial products. Moreover, the polymer containing at least one carboxylic acid has improved dispersion power for minerals such as calcium carbonate, and increased antiscaling capacity, relative to current commercial products. The polymer containing at least one carboxylic acid demonstrates superior clay dispersion, relative to commercial products. The superior dispersion means the solids level of clay in a clay slurry can be increased. The increased solids can translate into a positive impact on the energy costs of drying a ceramic material having the clay slurry comprising the polymer containing at least one carboxylic acid described herein. The polymer containing at least one carboxylic acid has comparable or improved grinding power, compared to commercial products. Slurries for filler grinding comprising the polymer containing at least one carboxylic acid exhibit better stability and improved viscosity profiles compared to commercial products.

In view of at least these properties, the polymer containing at least one carboxylic acid can be advantageously used in a method of manufacturing that comprises a filler. Thus, in an embodiment, the method can comprise the use of the polymer containing at least one carboxylic acid described herein and a filler in a method of manufacturing. For example, in an embodiment, the polymer containing at least one carboxylic acid can be used in a composition with a filler for manufacturing paper. Exemplary fillers for paper manufacturing include but are not limited to kaolin, calcium carbonate such as calcite, marble, and combinations there. Use in paper manufacturing includes the use of a composition comprising the polymer containing at least one carboxylic acid as a coating system for paper or paperboard. Coating systems can also be used for coating non-cellulosic substrates such as polyethylene (PE), polylactic acid (PLA), and polyvinyl acetate (PVAc). Coating systems are known in the art. See, for instance, U.S. Publication No. 2011/0046284. In another embodiment, the polymer containing at least one carboxylic acid can be used in a composition with one or more clay minerals for manufacturing ceramic. Exemplary ceramics include but are not limited to ceramic tiles and cordierite. Advantageously, as demonstrated herein, the polymer of the present disclosure exhibits improved dispersion power compared to prior art products. The increased dispersion power means that the solids level in a clay slurry can be increased. Similarly, the polymer containing at least one carboxylic acid can be used in a composition with calcium carbonate (dispersions) for manufacturing paper and paints. A process for manufacturing paper, ceramics, and/or paints can comprise a step where a composition comprising the polymer containing at least one carboxylic acid described herein and a filler are provided. In particular, the composition comprising the polymer containing at least one carboxylic acid described herein and a filler can include a slurry.

EXAMPLES

Example 1

Production of Stable Polyacrylic Acid—a Homopolymer of Acrylic Acid

The process for polymerization was a semi-batch synthesis, wherein the monomer was simultaneously added with an initiator and a chain transfer agent. 100 grams of deionized water, 2 grams of phosphoric acid and 5 grams of sodium hypophosphite were added to a glass polymerization vessel. The contents of the glass polymerization vessel were kept under agitation and inert atmosphere by nitrogen injection. A first separate vessel was filled with 90 grams of a 10% sodium persulfate aqueous solution. A second separate vessel was filled with 160 grams of a 20% sodium hypophosphite aqueous solution. A third vessel was filled with 320 grams of acrylic acid, wherein the acrylic acid had been previously treated with 0.04% of phenolthiazine. The polymerization vessel was heated up to 85° C., then the contents of each of the three separate vessels were added simultaneously and/or linearly to the contents of the glass polymerization vessel over 300 minutes, maintaining the temperature at 95° C. After the addition step, the temperature of the contents of the glass polymerization vessel was reduced to 40° C., then a redox treatment was performed by adding 3 g of hydrogen peroxide and 1 g of sodium bissulphite to the contents of the polymerization vessel. The final product was a 49-51% acid solution of stabilized polyacrylic acid, homopolymer, having a MW (molecular weight) of 2000 g/mol (Daltons), a polydispersity (PD) of 1.8, a pH~2.0, and APHA (American Public Health Association) color around 200. Long term stability of the end polyacrylic acid was measured by GPC data after one month. The results were Mw=2050, Pd=1.82, and pH~2.1, which indicated that the acid form polymer maintained its characteristics.

1.1. Performance Tests in Kaolin Processing 1.1.1. Kaolin Dispersion

Example 1 was tested for kaolin processing in comparison with two reference dispersant products. Reference 1 is a fully neutralized low molecular weigh sodium polyacrylate (Mw~2000, Pd~1.70, dosage 47%, pH~8.0). Reference 2 is a partially neutralized low molecular weigh sodium polyacrylate (Mw~2000, Pd~1.70, dosage 50%, pH~3.5).

A 74% solids slurry at pH 6.50-7.50 was prepared for each of Example 1 and the two reference products. The slurries comprised a coating kaolin grade product called Amazon 88. Amazon 88 is a commercially available grade of kaolin obtained from Cadam (Caulim da Amazônia). The pH of each slurry was properly adjusted with sodium hydroxide 50%, added in parallel with the addition of the dispersant to maintain the pH in the specified range. The slurries were prepared in a Hamilton Beach® (Scovill) type Mixer, model 936.

The performance of each sample was measured via dispersion curves (dosage versus Brookfield® Viscosity, RVT, 100 rpm, 25° C.). Table 1 below shows the results, where the dosages are expressed in weight % of the product (dry weight) relative to the total dry weight of kaolin. The minimum viscosity points are underlined:

TABLE 1

| Product | Dosage, % | Visc. RVT, 100 RPM, mPa · s | Slurry pH | Total Demand NaOH 50%, % |
|---|---|---|---|---|
| Example 1 | 0.10 | 330 | 7.10 | 0.23 |
| | 0.12 | 305 | 6.90 | 0.23 |
| | 0.14 | 280 | 6.60 | 0.25 |
| | <u>0.16</u> | <u>270</u> | <u>6.90</u> | <u>0.27</u> |
| | 0.18 | 272 | 7.10 | 0.30 |
| | 0.20 | 275 | 7.30 | 0.32 |
| | 0.22 | 277 | 7.00 | 0.32 |
| Reference 1 | 0.10 | — | — | — |
| | 0.12 | 425 | 7.50 | 0.24 |
| | 0.14 | 380 | 7.50 | 0.24 |
| | 0.16 | 350 | 7.50 | 0.24 |
| | 0.18 | 330 | 7.50 | 0.24 |
| | 0.20 | 320 | 7.50 | 0.24 |
| | 0.22 | 310 | 7.40 | 0.24 |
| | 0.24 | 300 | 7.40 | 0.24 |
| | <u>0.26</u> | <u>290</u> | <u>7.40</u> | <u>0.24</u> |
| | 0.28 | 295 | 7.40 | 0.24 |
| | 0.30 | 305 | 7.45 | 0.24 |
| Reference 2 | 0.10 | 340 | 7.20 | 0.26 |
| | 0.12 | 320 | 7.00 | 0.26 |
| | 0.14 | 305 | 7.40 | 0.28 |
| | 0.16 | 300 | 7.20 | 0.28 |
| | <u>0.18</u> | <u>285</u> | <u>7.00</u> | <u>0.28</u> |
| | 0.20 | 280 | 6.90 | 0.28 |
| | 0.22 | 285 | 6.70 | 0.28 |

Figure 2:
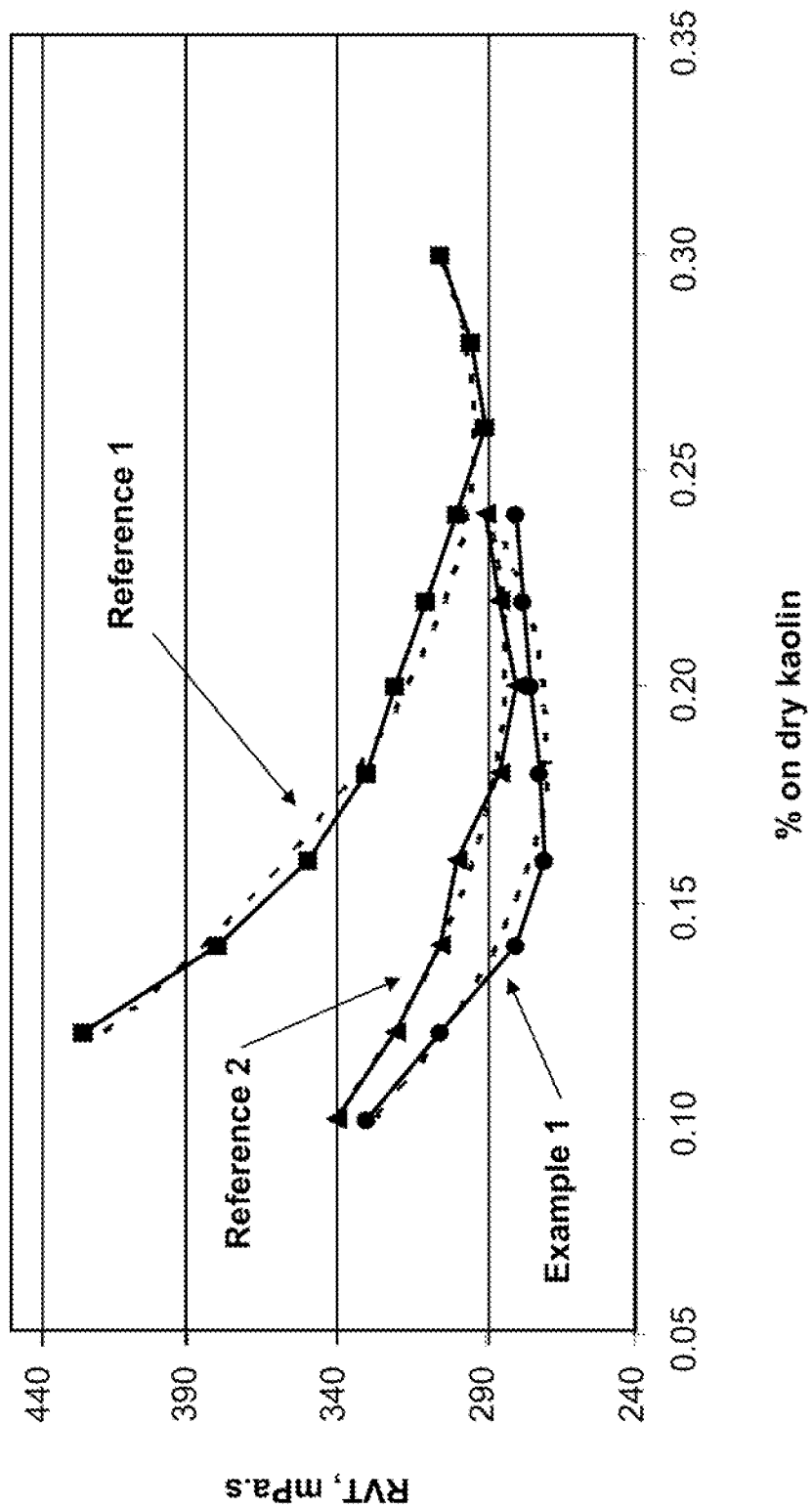
FIG. 2 is a graph plotting viscosity against weight percentage product (dry weight) relative to the total dry weight of kaolin, for a kaolin dispersion.

These data are plotted in FIG. 2. The graph in FIG. 2 shows the curves and respective tendency dashed curves, where it was demonstrated that the polymer of the present disclosure exhibits better performance in terms of viscosity reduction in the kaolin slurry, compared to References 1 and 2.

1.1.2. Kaolin Dispersion Stability

Fresh 74% slurries were prepared, using the dosages of the minimum viscosity points of the dispersion curve in FIG. 2. The slurries were placed in tightly sealed containers and placed at 25° C. for 30 days to simulate aging and storage. During storage, the viscosity was evaluated after 1, 4, 6, 12, 24 and 30 days at 25° C.

Figure 3:
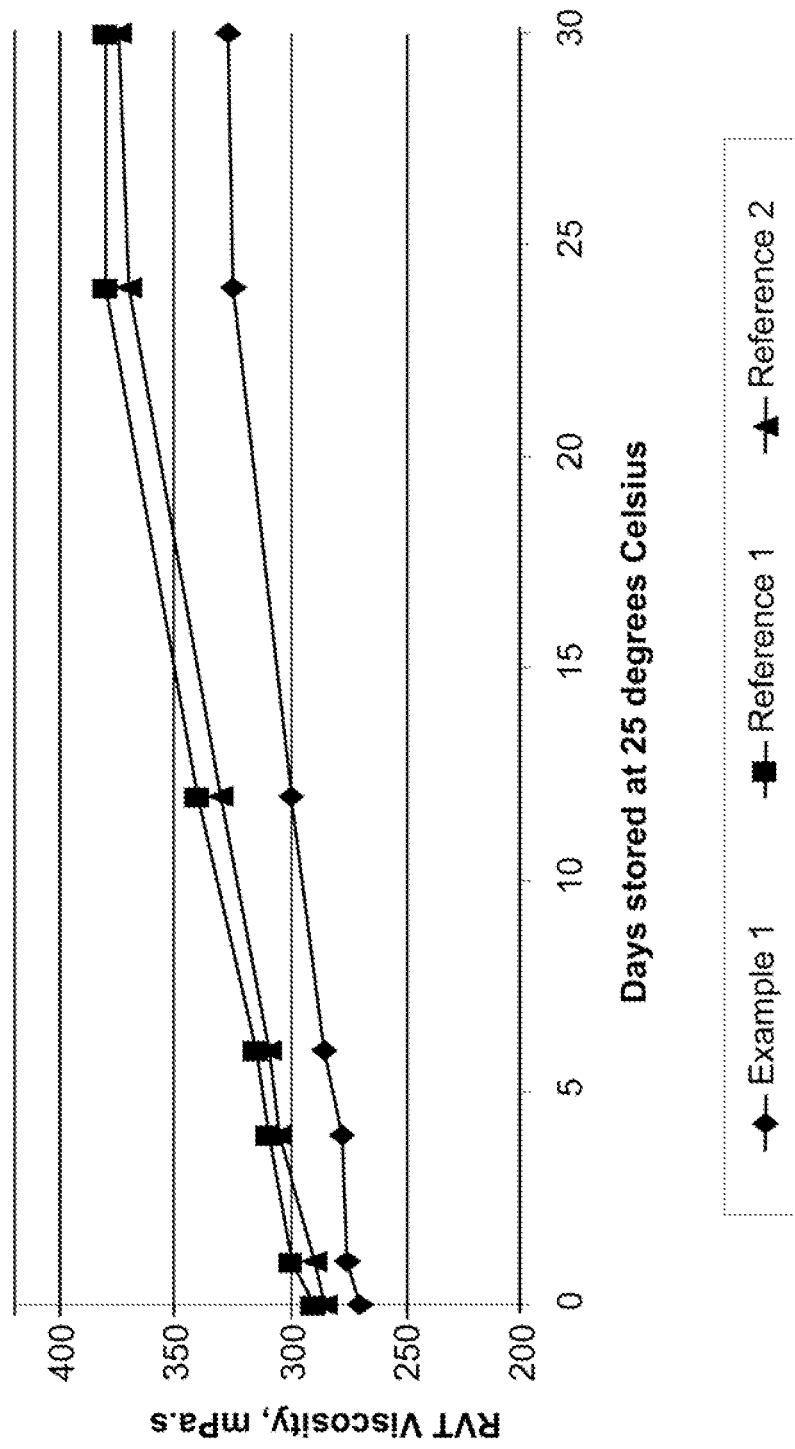
FIG. 3 is a graph plotting viscosity as a function of time for a kaolin dispersion stored at 25° C.

The graph in FIG. 3 shows the behaviors of the dispersions. It can be seen that the slurry prepared with Example 1 exhibited a lower tendency for viscosity increase in comparison with fully and partially neutralized homopolymers (references 1 and 2).

Example 2

Production of Stable Polyacrylic Acid—a Copolymer of Acrylic Acid and Maleic Anhydride The same equipment and semi-batch process used in Example 1 was also used in the following procedure for preparing Example 2. 420 grams of deionized water, 3 grams of phosphoric acid, 2 grams of a 1% $FeSO_4$ aqueous solution, and 240 grams of maleic anhydride were added to a glass polymerization vessel. The contents of the glass polymerization vessel were agitated and kept under inert conditions using nitrogen injection. A first separate vessel filled with 100 grams of a 35% hydrogen peroxide solution (aqueous). A second separate vessel was filled with 280 grams of acrylic acid, wherein the acrylic acid had been previously treated with 0.02% of phenolthiazine. The glass polymerization vessel was heated up to 110° C. The contents of the glass polymerization vessel were heated to 130° C. for 240 minutes, and at which time, the contents of the second separate vessel (acrylic acid) were added to the contents of the glass polymerization vessel. Further, the contents of the first vessel (hydrogen peroxide) were added to the contents of the glass polymerization vessel at about 360 minutes. The temperature was maintained at about 130° C. during both addition steps. After the addition steps, the temperature of the contents of the glass polymerization vessel was reduced to about 40° C., then a redox treatment was performed by adding 3 g of sodium bissulphite to remove traces of hydrogen peroxide. The final product was a ~51% acid solution of stabilized acid copolymer of acrylic acid and maleic anhydride, having a pH~1, MW of 5000 g/mol (Daltons) and reasonable color and good long term stability.

2.1. Performance Tests as Dispersant and Anti-Scaling Agent in Calcium Carbonate Slurries Fully neutralized copolymers of acrylic acid and maleic anhydride were applied in mineral processing as dispersants and anti-scaling agents for mineral pulp transport to avoid deposits over pipe walls, filters, sieves and overall equipments used in mineral processing. For this purpose, the dispersion power of Example 2 was evaluated in a calcium carbonate slurry of 73.5% solids and using a Hampshire Test, as discussed in section 2.1.2, to measure the anti-scaling capacity of the copolymers.

2.1.1. Dispersion of Calcium Carbonate

The dispersion capability of Example 2 was tested in comparison with a commercially-available product for dispersing calcium carbonate as a reference. The reference product, Reference 3, is a fully neutralized type of acrylic-maleic copolymer (Mw~4000, PD~2.00, dosage 50%, pH~8.0). A higher strength mixer type, NETZSCH® model PE075, was used to prepare the slurries. A fine calcium carbonate, PCC type, was used in a 73.5% solids slurry, pH 9.5-10.5, properly adjusted with sodium hydroxide 50%, and added in parallel with the addition of the dispersant to maintain the pH in the mentioned range. The performance was measured via dispersion curves (dosage versus Brookfield® Viscosity, RVT, 100 rpm, 25° C.). For Example 2, the control of pH is crucial to avoid $CO_2$ generation (calcium carbonate decomposition), which can occur if the pH falls below 7.0. Table 2 below shows the results of the study, wherein the dosages are expressed in wt % of the polymer (dry weight) based on the total dry weight of dry calcium carbonate.

TABLE 2

| Product | Dosage, % | Visc. RVT, 100 RPM, mPa · s | Slurry pH | Total Demand NaOH 50%, % |
|---|---|---|---|---|
| Example 2 | 2.60 | 1484 | 10.2 | 0.26 |
|  | 2.74 | 1440 | 9.6 | 0.32 |
|  | 2.88 | 1100 | 9.6 | 0.38 |
|  | 3.02 | 1060 | 9.6 | 0.44 |
|  | 3.16 | 1100 | 9.7 | 0.51 |
| Reference 3 | 3.25 | 1505 | 10.2 | 0.07 |
|  | 3.40 | 1460 | 10.3 | 0.10 |
|  | 3.55 | 1170 | 10.3 | 0.10 |
|  | 3.80 | 1150 | 10.3 | 0.10 |
|  | 4.00 | 1200 | 10.2 | 0.12 |

Figure 4:
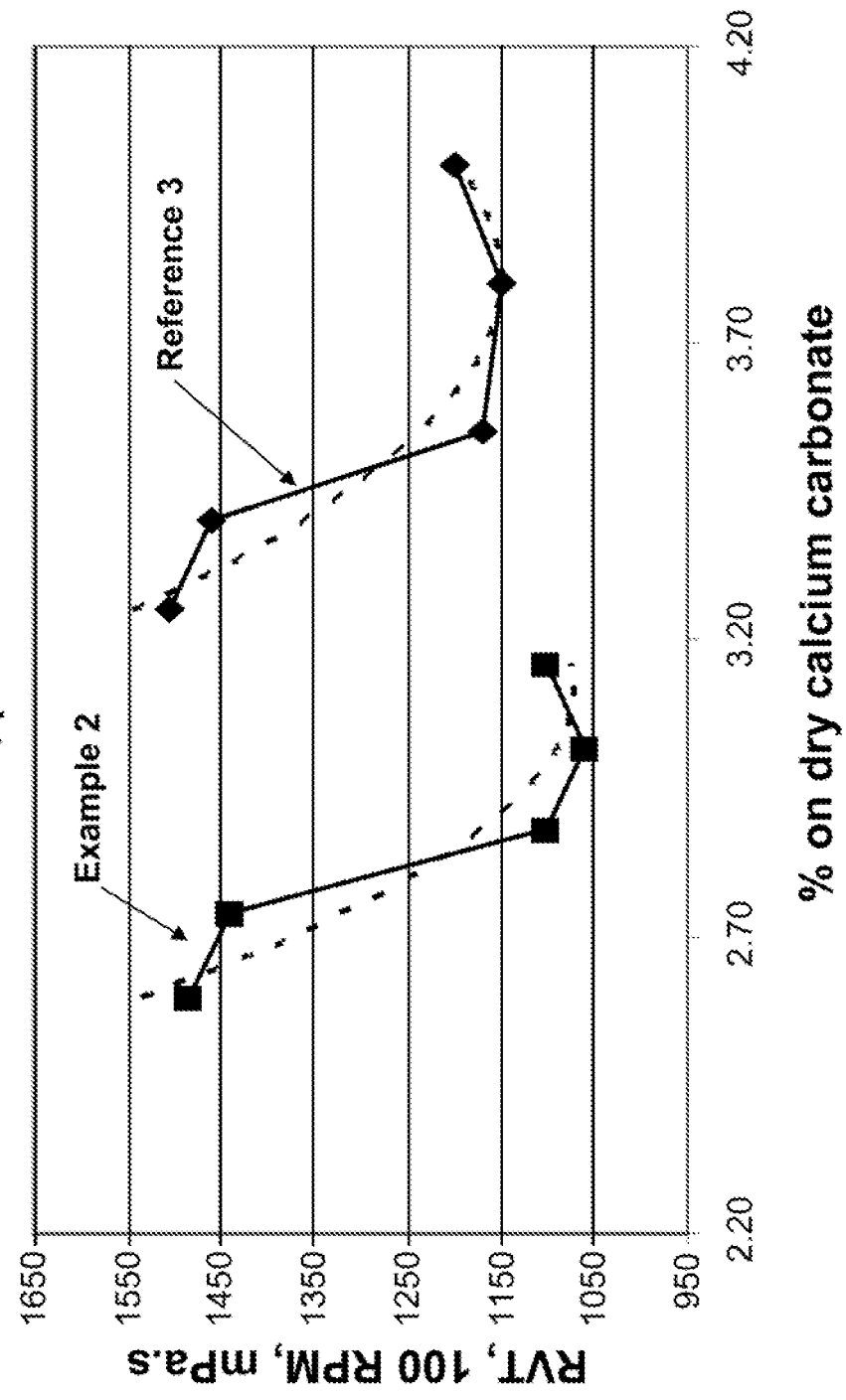
FIG. 4 is a graph plotting viscosity against wt % of the polymer (dry weight) based on the total dry weight of dry calcium carbonate, for a calcium carbonate dispersion.

These data are plotted in FIG. 4. The graph in FIG. 4 illustrates the dispersion behaviors and respective dashed trend lines, wherein it can be seen that Example 2, properly neutralized during dispersion process in order to keep the pH in the range 9.5-10.5, exhibits better dispersion power in comparison with the fully neutralized copolymer version.

2.1.2. Hampshire Test—Anti-Scaling Properties

Example 2 was also evaluated for its properties as an anti-scaling agent for limestone type scale (calcium carbonate) through the following method, generally known as the Hampshire Test. In this titration method, the end point appears as a cloudiness which occurs when added calcium ions are no longer sequestered and/or dispersed by the dispersant. At that point, the additional calcium precipitates in the form of calcium carbonate, resulting in cloudiness. Approximately 1 g of Example 2 was weighed out accurately into a 150 mL beaker. The sample was dissolved in 100 ml of distilled water and mixed with enough NaOH 50% to achieve pH 8, then 10 ml of a 2% $Na_2CO_3$ solution was added. The pH was adjusted to 11 with NaOH 50% and kept constant during the titration. Titration was performed with a calcium acetate solution 4.4%, until a noticeable and permanent cloudiness appeared. It is important to maintain a uniform rate to titration to obtain reproducible results. The anti-scaling capacity was then calculated in terms of mg $CaCO_3$ per gram of dispersant according to the following equation: ml $(CH_3COO)_2Ca \times 25$/sample weight.

Figure 5:
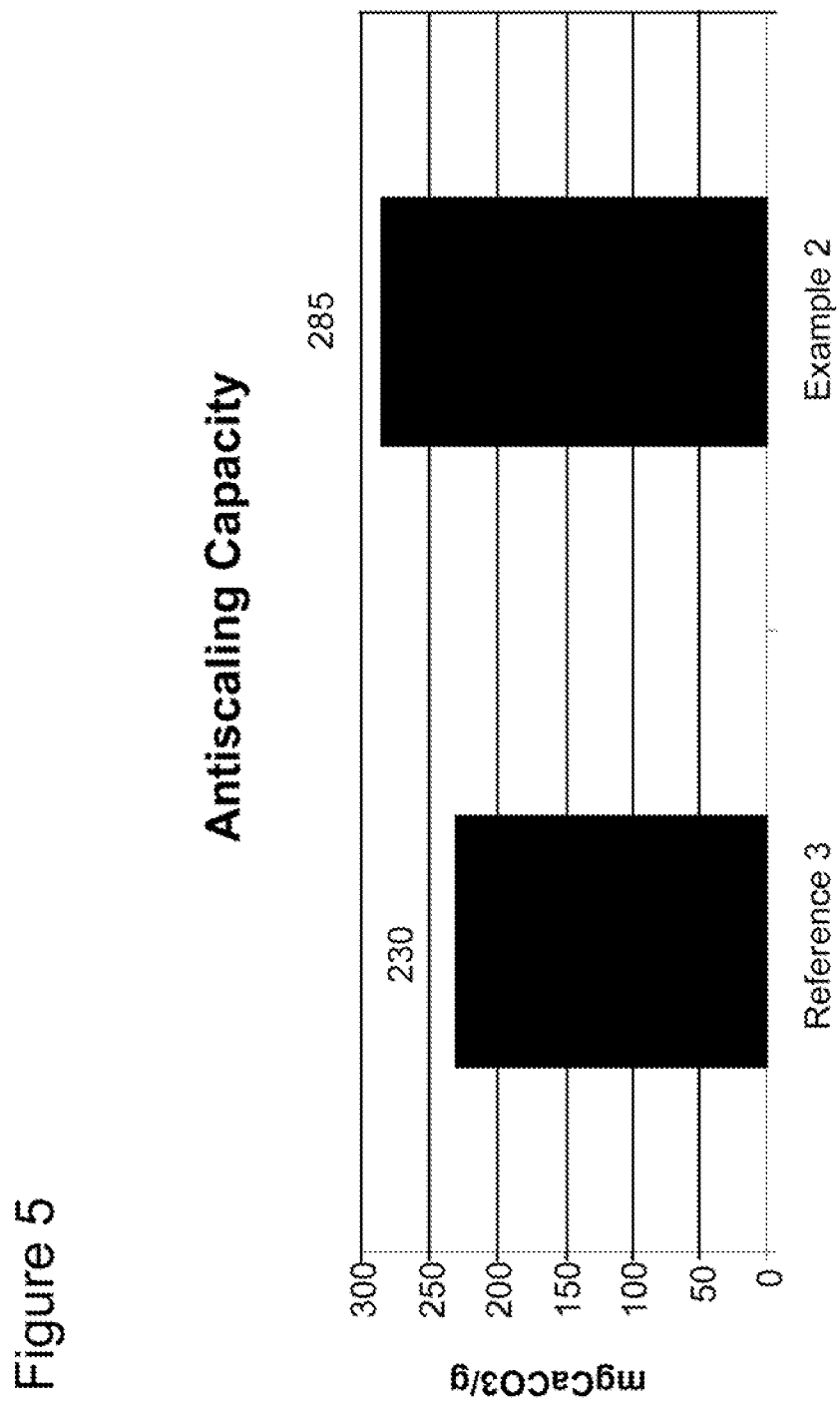
FIG. 5 is a graph of anti-scaling capacity.

The graph in FIG. 5 illustrates the results obtained for the Example 2 and a reference copolymer product, trademark Sokalan® CP 12 (fully neutralized). The data illustrate that the polymer of the present disclosure has a greater anti-scaling capacity than the reference material.

Example 3

Production of Stable Polyacrylic Acid—Low-Medium Molecular Homopolymer of Acrylic Acid for Ceramic Processing The same equipment and semi-batch process used in Example 1 was also used in the following procedure for Example 3. Acrylic acid was simultaneously added with an initiator and a chain transfer agent, 500 grams of deionized water, 2.2 grams of phosphoric to a glass polymerization vessel. The contents of the glass polymerization vessel was kept under agitation and inert atmosphere by nitrogen injection. A first separate vessel was filled with 65 grams of a 10% sodium persulfate aqueous solution. A second separate vessel was filled with 25 grams of mercaptoethanol. A third separate vessel was filled with 616 grams of acrylic acid, wherein the acrylic acid had been previously treated with 0.03% of phenolthiazine and 0.02% methyl ether hydroquinone. The polymerization vessel was heated up to 85° C., then the contents of each of the three separate vessels were added simultaneously and/or linearly to the contents of the glass polymerization vessel over 300 minutes, maintaining the temperature at 95° C. After the addition step, the temperature of the contents of the glass polymerization vessel was reduced to 40° C., then a redox treatment was performed by adding 12 g of hydrogen peroxide 35% and maintaining the product for 1 hour under agitation. The final product was a solids ~51% acid solution of stabilized polyacrylic acid, homopolymer, having GPC data (Mw=molecular weight) of 8000 g/mol (Daltons), PD= (polidispersity) of 1.9, a pH~2, APHA color around 400. Long-term stability of the end polyacrylic acid was measured by GPC data after one month. The results were Mw=8050, PD=1.97, pH~2.4, which indicates that the acid form polymer maintained its characteristics during storage.

3.1. Performance Test as Clay Dispersant for Ceramic Tiles

Example 3 was tested in a typical monofire clay slurry for ceramic tiles production, in comparison with reference products from the market. The two commercial products used as references were: Reference 4 (sodium polyacrylate, solids=45%, pH~8.0 and Mw~8000), and an alkaline sodium silicate (solids=45%, pH~10.0), which is commonly used as a dispersant for ceramic clay processing. The clay used was obtained from Brazil, and is a typical ceramic clay used for ceramic tiles. The slurries were prepared in a Hamilton Beach (Scovill) type mixer, model 936. The pH for Example 3 was properly adjusted with NaOH 50% after every addition of dispersant (% based dry clay) to maintain the pH=8.0+/−0.5. Table 3 below shows the results, where the dosages are expressed in wt % of the dispersant polymer (dry weight) based on the total dry weight of the clay.

TABLE 3

| Product | Dosage, % | Visc. RVT, 100 RPM, mPa · s | Slurry pH | NaOH 50%, % |
|---|---|---|---|---|
| Example 3 | 0.13 | 790 | 7.7 | 0.15 |
|  | 0.15 | 535 | 7.9 | 0.15 |
|  | 0.17 | 451 | 8.2 | 0.18 |
|  | 0.18 | 375 | 7.9 | 0.20 |
|  | 0.20 | 350 | 8.3 | 0.22 |
|  | 0.22 | 335 | 8.2 | 0.22 |
|  | 0.23 | 329 | 8.1 | 0.22 |
| Reference 3 | 0.14 | 1290 | 7.8 | 0.07 |
|  | 0.16 | 840 | 8.0 | 0.09 |
|  | 0.17 | 640 | 8.1 | 0.10 |
|  | 0.18 | 460 | 8.2 | 0.10 |
|  | 0.20 | 400 | 8.1 | 0.10 |
|  | 0.21 | 405 | 8.0 | 0.12 |
|  | 0.23 | 403 | 8.3 | 0.12 |
|  | 0.24 | 403 | 8.1 | 0.12 |
| Sodium Silicate | 0.15 | 725 | 8.1 | 0.02 |
|  | 0.16 | 620 | 8.2 | 0.02 |
|  | 0.18 | 580 | 8.1 | 0.02 |
|  | 0.20 | 595 | 8.0 | 0.05 |
|  | 0.20 | 608 | 8.3 | 0.07 |
|  | 0.21 | 615 | 8.4 | 0.07 |
|  | 0.22 | 620 | 8.3 | 0.07 |

Figure 6:
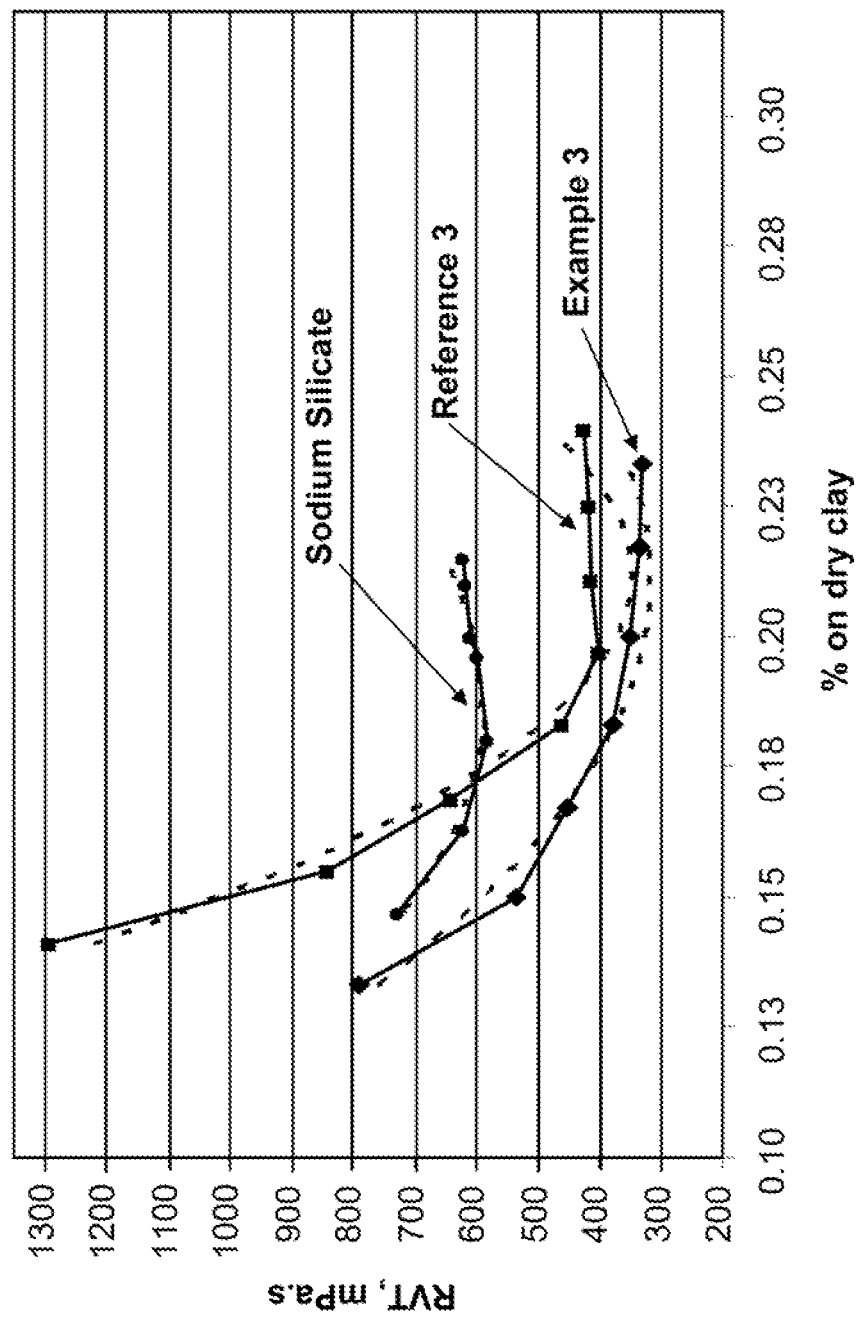
FIG. 6 is a graph plotting the viscosity against wt % of the dispersant polymer (dry weight) based on the total dry weight of the clay, for a clay dispersion.

These data are plotted in FIG. 6. The graph in FIG. 6 illustrates the dispersion behavior and respective tendency dashed lines. It can be seen that Example 3, when properly neutralized during the dispersion process, demonstrates better dispersion power in comparison with fully neutralized sodium polyacrylate (Reference 3) and alkaline sodium silicate. Due to this superior behavior, it would be possible raise the solids level in the clay slurry with further positive impact for drying energy costs.

Example 4

Production of Stable Polyacrylic Acid—Medium Molecular Homopolymer of Acrylic Acid for Calcite and Marble Grinding A 5 L glass polymerization vessel and semi-batch process was used as discussed above for Example 1. 1,350 grams of deionized water, 8.6 grams of phosphorous acid were added to a glass polymerization vessel. The contents of the glass polymerization vessel were kept under agitation and inert atmosphere by nitrogen injection. A first separate vessel was filled with 179 grams of a 10% sodium persulfate aqueous solution. A second separate vessel was filled with 968 grams of a 20% sodium hypophosphite aqueous solution. A third vessel was filled with 1.567 grams of acrylic acid, wherein the acrylic acid had been previously treated with 0.04% of phenolthiazine. The polymerization vessel was heated up to 85° C., then the contents of each of the three separate vessels were added simultaneously and/or linearly to the contents of the glass polymerization vessel over 300 minutes, maintaining the temperature at 95° C. After the addition step, the temperature of the contents of the glass polymerization vessel was reduced to 40° C., then a redox treatment was performed by adding 26.9 g of hydrogen peroxide 35% and 8.10 g of sodium bissulphite to the contents of the polymerization vessel. The final product was a 49-51% acid solution of stabilized polyacrylic acid, homopolymer, having GPC data, Mw~5000, PD~1.80, pH~2.5, APHA color around 450. Long term stability of the end polyacrylic acid was measured by GPC data after one month. The results were Mw=5250, PD=1.85, pH~2.3, which indicates that the acid form polymer maintained its characteristics during storage.

4.1. Performance Test as Dispersant for Calcite and Marble Grinding

Figure 7:
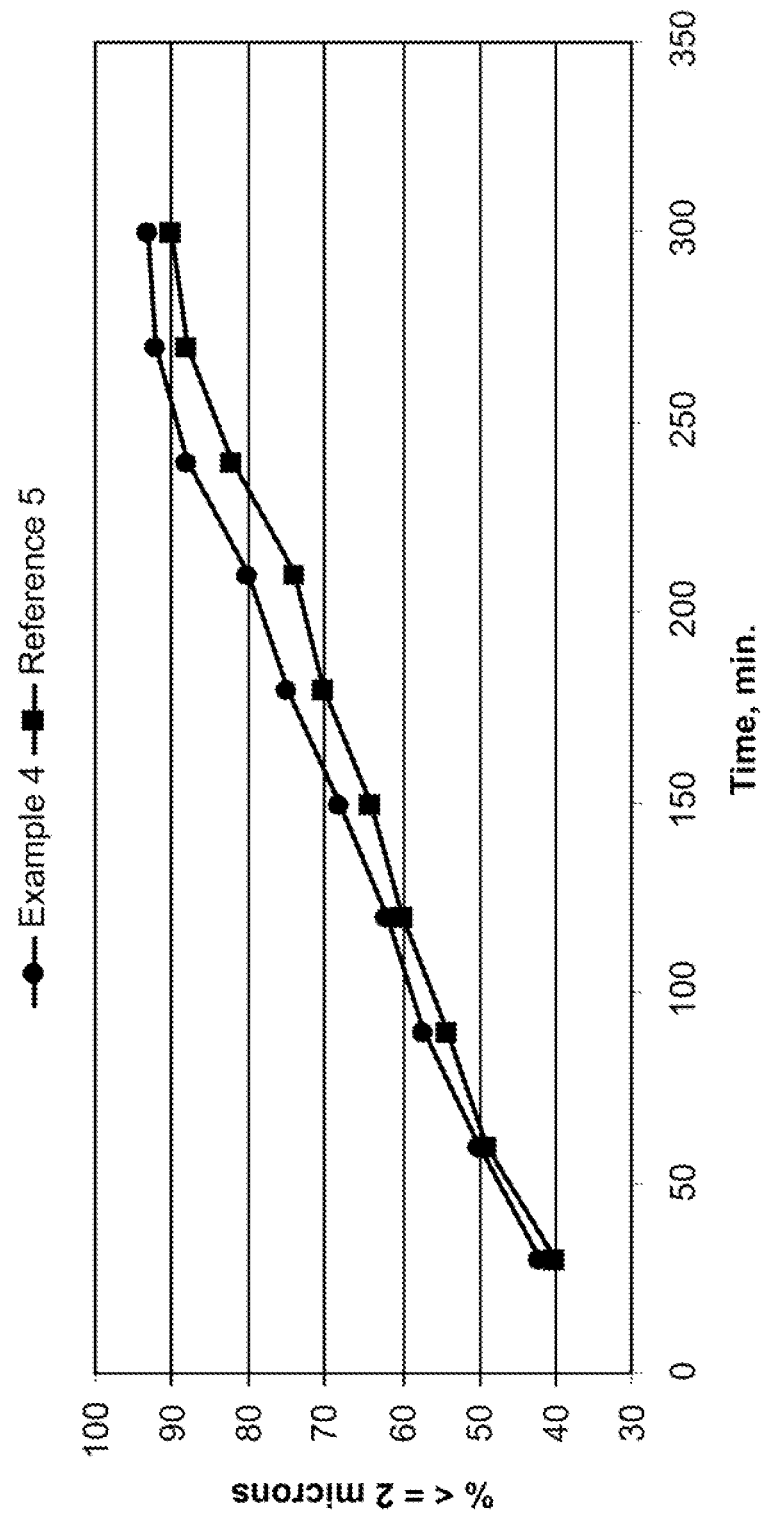
FIG. 7 is a graph plotting the percentage of calcite particles below 2 microns as a function of grinding time.

Example 4 was tested as a dispersing agent for calcite grinding in comparison with a commercially-available product used as reference: Reference 5 (sodium polyacrylate, solids=46%, pH~8.0 and Mw~6000). The grinding tests used a higher strength mixer type, NETZSCH® model PE075. For these tests, a natural calcite slurry 72%, previously floated to remove silica, was mechanically ground until the particle size was 5%<=2 microns, 40%<=40 microns. This slurry was charged in the grinding vessel in a weight 1:1 with grind media type zirconium silicate beads. Dispersants were dosed at 1.0% based dry calcite. For Example 4, NaOH 50% was previously added to maintain the pH in the range of 9.0-10.0 and therefore avoid $CO_2$ generation due to calcite decomposition. Grinding was performed over 6 hours at a speed of 32 Hertz with small samples being taken every 30 minutes to measure the particle size. Grinding was measured using Malvern® Mastersizer 2000. The graph in FIG. 7 illustrates the grinding profile, where Example 4 demonstrated a grinding power at least the same as or better than Reference 5.

4.1.1. Rheology Stability

Figure 8:
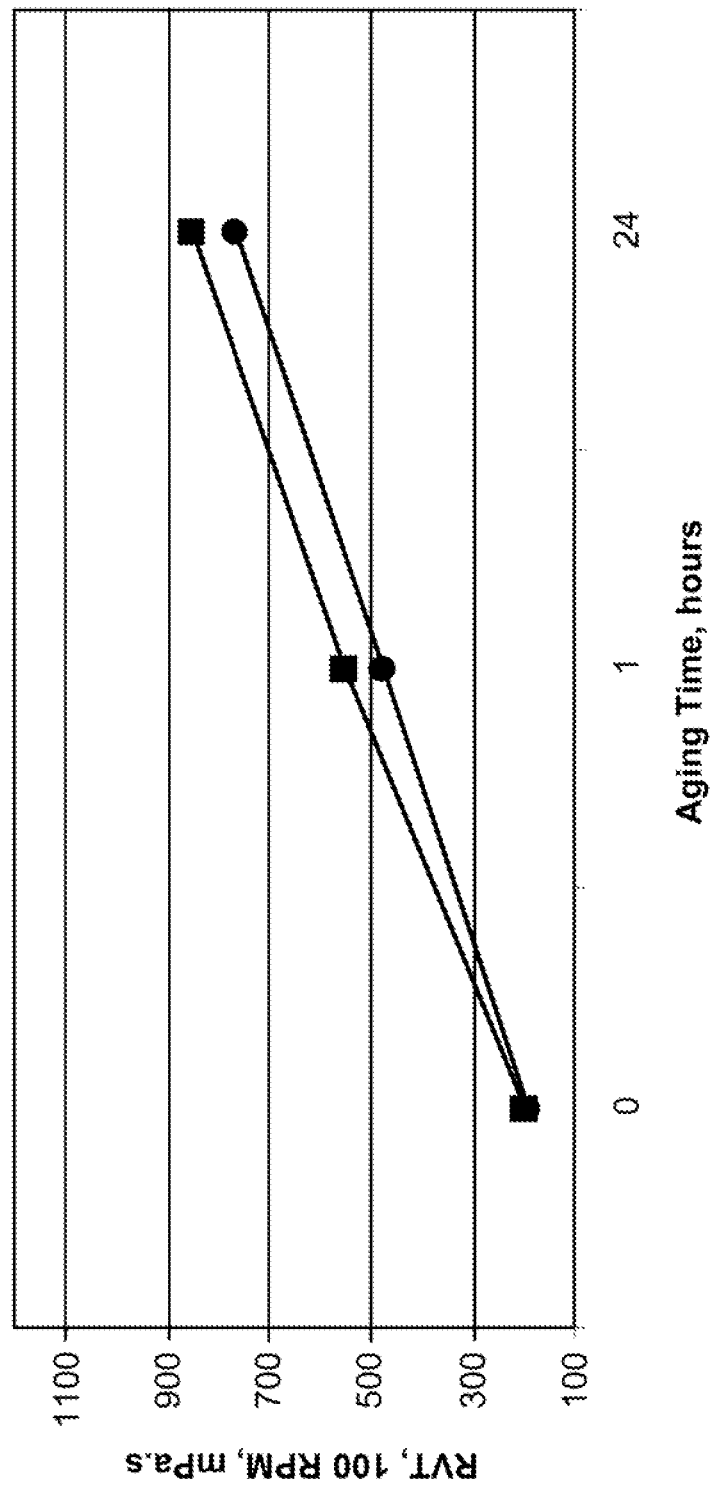
FIG. 8 is a graph plotting viscosity as a function of time as a measure of rheology stability.

The above-mentioned grinding slurries were evaluated in terms of their rheology stability, as measured through Brookfield Viscosity, RVT 100 rpm, after aging of 0 (just after grinding process), 1 hour and 24 hours (after grinding process). The graph in FIG. 8 illustrates these data. Example 4 exhibits a better stability with lower trends for viscosity increase in comparison to Reference 5.

All cited patents and publications referred to in this application are herein incorporated by reference in their entirety for all purposes.

What is claimed is:

1. An aqueous composition comprising:
   (1) a homopolymer selected from the group consisting of:
      (a) a homopolymer of acrylic acid, having a molecular weight (Mw) of about 2000 g/mol and a polydispersity of 1.8;
      (b) a homopolymer of acrylic acid, having a molecular weight (Mw) of about 5000 g/mol and a polydispersity of 1.8; and
      (c) a homopolymer of acrylic acid, having a molecular weight (Mw) of about 8000 g/mol and a polydispersity of 1.9,
   wherein the homopolymer is in acid form and has not been neutralized, and is characterized by superior rheological performance in a mineral slurry relative to a reference homopolymer of acrylic acid of comparable molecular weight and polydispersity, wherein the reference homopolymer is a fully neutralized polymer; and
   (2) a filler selected from kaolin, talc, clay, white carbon, aluminum hydroxide, titanium dioxide, calcium carbonate, calcite, marble, or a mixture thereof,
   wherein the aqueous composition is a slurry.

2. The aqueous composition of claim 1, wherein the filler is kaolin, talc, clay, white carbon, aluminum hydroxide, titanium dioxide, calcium carbonate, calcite, or marble.

3. A method of mineral processing comprising:
   adding a homopolymer of acrylic acid to an aqueous solution containing a filler to form an aqueous slurry, wherein the homopolymer is selected from group consisting of:
      (a) a homopolymer of acrylic acid, having a molecular weight (Mw) of about 2000 g/mol and a polydispersity of 1.8;
      (b) a homopolymer of acrylic acid, having a molecular weight (Mw) of about 5000 g/mol and a polydispersity of 1.8; and
      (c) a homopolymer of acrylic acid, having a molecular weight (Mw) of about 8000 g/mol and a polydispersity of 1.9,
   wherein the homopolymer is in acid form and has not been neutralized, and is characterized by superior rheological performance in a mineral slurry relative to a reference homopolymer of acrylic acid of comparable molecular weight and polydispersity, wherein the reference homopolymer is a fully neutralized polymer, and
   wherein the filler is selected from kaolin, talc, clay, white carbon, aluminum hydroxide, titanium dioxide, calcium carbonate, calcite, marble, or a mixture thereof.

4. The aqueous composition of claim 1, wherein the polymer is a homopolymer of acrylic acid, having a molecular weight (Mw) of about 2000 g/mol and a polydispersity of 1.8.

5. The aqueous composition of claim 1, wherein the polymer is a homopolymer of acrylic acid, has a molecular weight (Mw) of about 5000 g/mol and a polydispersity of 1.8.

6. The aqueous composition of claim 1, wherein the polymer is a homopolymer of acrylic acid, having a molecular weight (Mw) of about 8000 g/mol and a polydispersity of 1.9.

7. The method of mineral processing according to claim 3, wherein the filler is kaolin, talc, clay, white carbon, aluminum hydroxide, titanium dioxide, calcium carbonate, calcite, or marble.

8. A method of manufacturing paper comprising:
providing a aqueous composition comprising
(1) a homopolymer selected from the group consisting of:
 (a) a homopolymer of acrylic acid, having a molecular weight (Mw) of about 2000 g/mol and a polydispersity of 1.8;
 (b) a homopolymer of acrylic acid, having a molecular weight (Mw) of about 5000 g/mol and a polydispersity of 1.8; and
 (c) a homopolymer of acrylic acid, having a molecular weight (Mw) of about 8000 g/mol and a polydispersity of 1.9,
wherein the homopolymer is in acid form and has not been neutralized, and is characterized by superior rheological performance in a mineral slurry relative to a reference homopolymer of acrylic acid of comparable molecular weight and polydispersity, wherein the reference homopolymer is a fully neutralized polymer; and
(2) a filler, wherein the filler is kaolin, calcium carbonate, or marble wherein the aqueous composition is a slurry.

9. A method of manufacturing ceramics comprising:
providing a aqueous composition comprising
(1) a homopolymer selected from the group consisting of:
 (a) a homopolymer of acrylic acid, having a molecular weight (Mw) of about 2000 g/mol and a polydispersity of 1.8;
 (b) a homopolymer of acrylic acid, having a molecular weight (Mw) of about 5000 g/mol and a polydispersity of 1.8; and
 (c) a homopolymer of acrylic acid, having a molecular weight (Mw) of about 8000 g/mol and a polydispersity of 1.9,
wherein the homopolymer is in acid form and has not been neutralized, and is characterized by superior rheological performance in a mineral slurry relative to a reference homopolymer of acrylic acid of comparable molecular weight and polydispersity, wherein the reference homopolymer is a fully neutralized polymer; and
(2) a filler, wherein the filler is clay wherein the aqueous composition is a slurry.

10. A method of manufacturing paints comprising:
providing a aqueous composition comprising
(1) a homopolymer selected from the group consisting of:
 (a) a homopolymer of acrylic acid, having a molecular weight (Mw) of about 2000 g/mol and a polydispersity of 1.8;
 (b) a homopolymer of acrylic acid, having a molecular weight (Mw) of about 5000 g/mol and a polydispersity of 1.8; and
 (c) a homopolymer of acrylic acid, having a molecular weight (Mw) of about 8000 g/mol and a polydispersity of 1.9,
wherein the homopolymer is in acid form and has not been neutralized, and is characterized by superior rheological performance in a mineral slurry relative to a reference homopolymer of acrylic acid of comparable molecular weight and polydispersity, wherein the reference homopolymer is a fully neutralized polymer; and
(2) a filler, wherein the filler is calcium carbonate wherein the aqueous composition is a slurry.

* * * * *